Sept. 30, 1969 W. D. LUDWIG 3,469,604
ROTARY VALVE
Filed Dec. 12, 1966 3 Sheets-Sheet 3

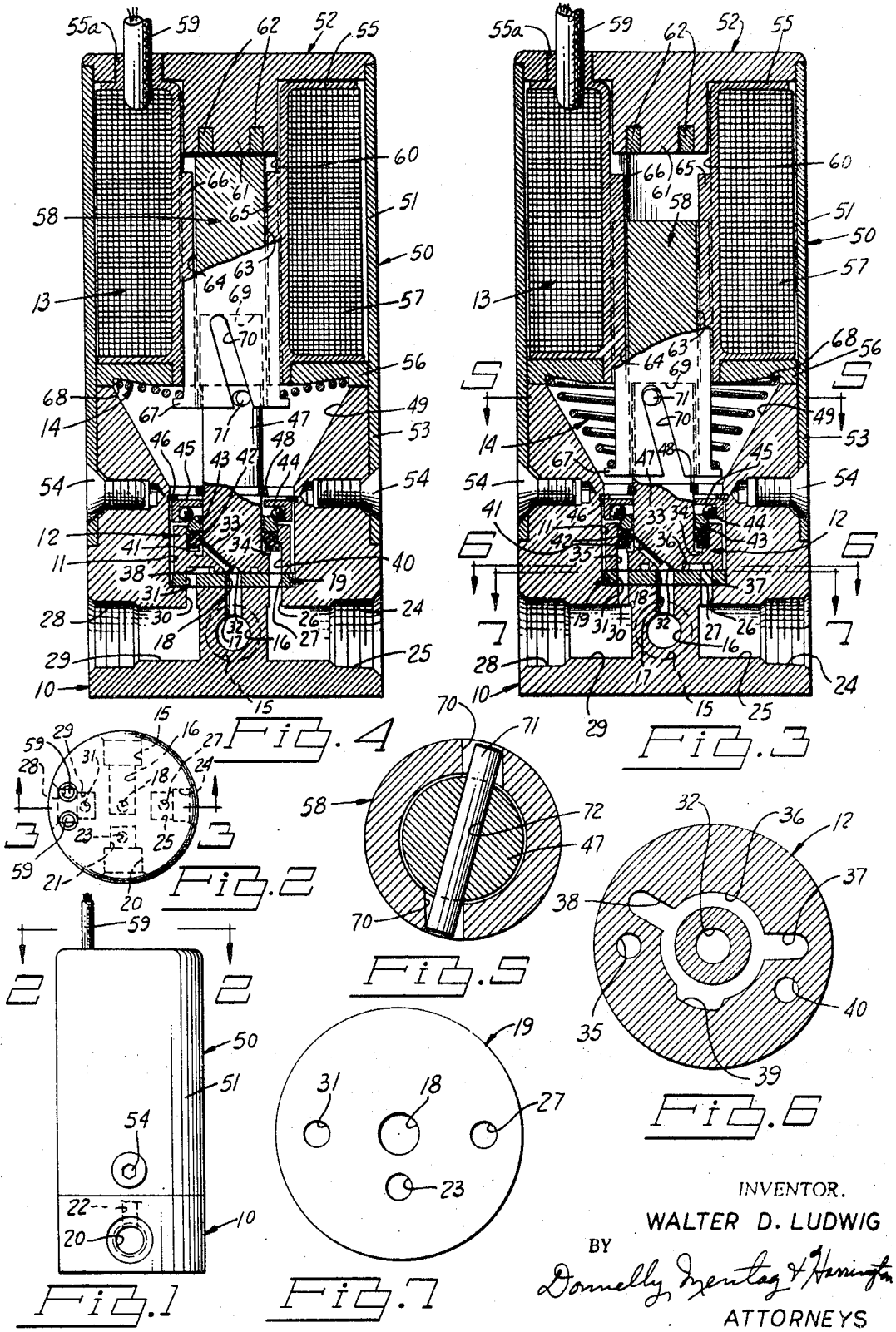

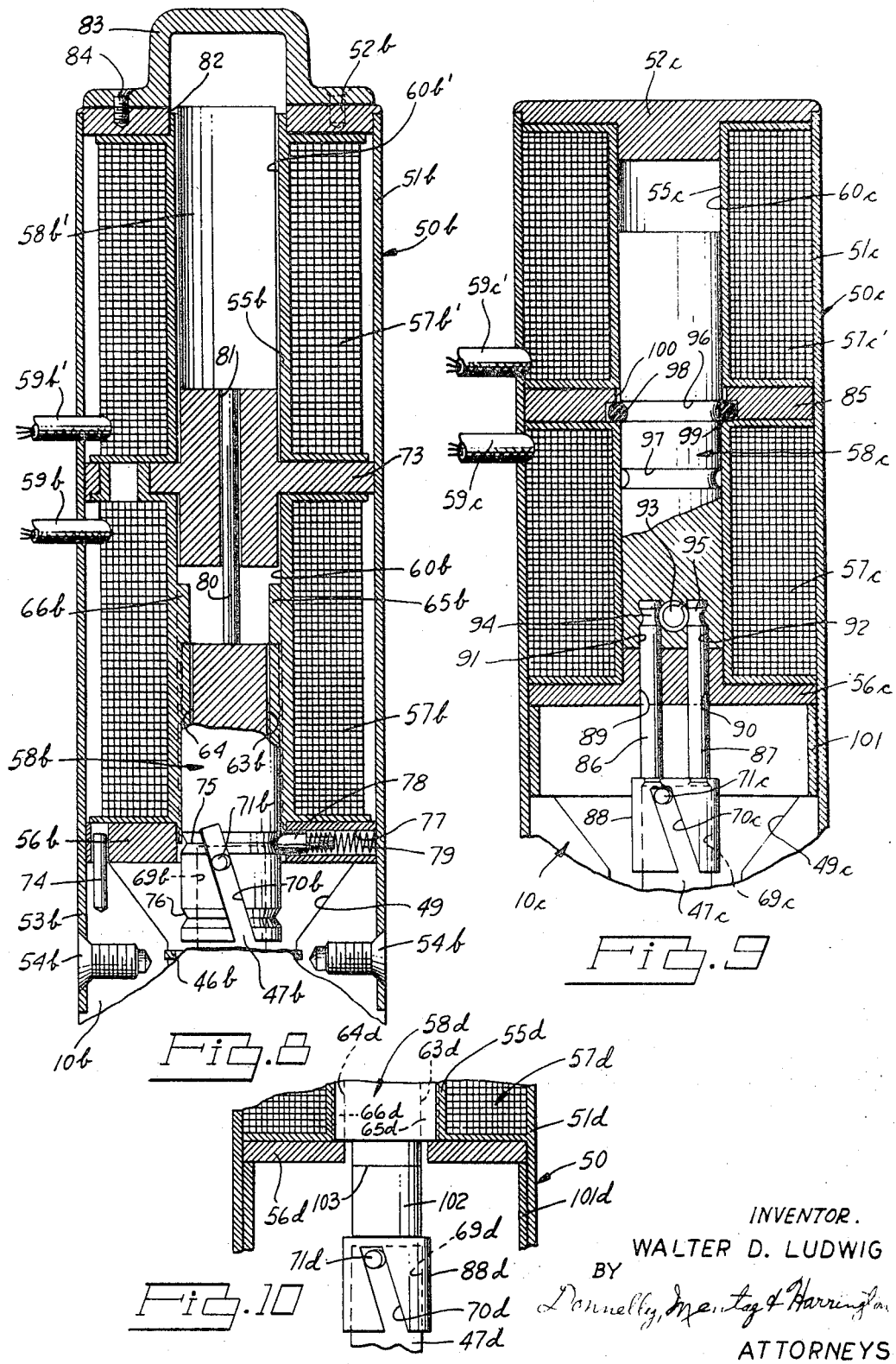

INVENTOR.
WALTER D. LUDWIG
BY
Donnelly, Mentag & Harrington
ATTORNEYS

United States Patent Office 3,469,604
Patented Sept. 30, 1969

3,469,604
ROTARY VALVE
Walter D. Ludwig, Bloomfield Township, Oakland
County, Mich., assignor to Mac Valves, Inc., Oak
Park, Mich., a corporation of Michigan
Filed Dec. 12, 1966, Ser. No. 600,965
Int. Cl. E03b 9/02; E03c; F17d
U.S. Cl. 137—625.43                                33 Claims

ABSTRACT OF THE DISCLOSURE

A four-way reversing valve which incorporates a valve element rotatable between working positions by either a linear actuating means or a rotary actuating means, and wherein said linear actuating means may be manually operated or power operated, and said rotary actuating means may be manually operated. The power operated linear actuating means may be actuated in two directions by a dual solenoid means, a solenoid means in one direction and a return spring in the other direction, or by an air pilot or vacuum pilot in one direction and a return spring in the other direction.

This invention relates generally to pressure fluid control valves, and more particularly, to a novel four-way rotary reversing valve.

Four-way rotary reversing valves having mechanical or electrical means for actuating a rotary valve element are well known in the art. One of the disadvantages of the prior art four-way rotary valves is that a large torque is required to rotate the rotary valve element to overcome the friction between the valve seat and the valve element and the pressure exerted on the valve element to maintain contact with the valve seat. Other disadvantages of the prior art four-way rotary valves is that they operate slowly, they are costly to machine, they are large in size, they are not positive in operation, and they are subject to self-destruction by the impact of co-operating elements.

In view of the foregoing, it is an important object of the present invention to provide a four-way rotary reversing valve which is constructed and arranged to overcome the aforementioned disadvantages of the similar prior art valves.

It is an other object of the present invention to provide a novel and improved four-way rotary reversing valve which is compact in construction, positive and fast in operation, and economical to manufacture.

It is another object of the present invention to provide a novel and improved four-way rotary reversing valve which is provided with an improved valve seat that functions to reduce the friction between the valve seat and the rotary valve element so as to reduce the torque required to rotate the valve element between the two working positions of the valve element.

It is still another object of the present invention to provide a novel and improved four-way rotary reversing valve which incorporates a valve element rotatable between two working positions by a linear actuating means which includes a linear operator movable along the axis of rotation of the valve element and engageable with the valve element for rotating the valve element between said positions.

It is a further object of the present invention to provide a four-way reversing valve comprising: a valve body; a valve chamber in said valve body having a closed inner end and an open outer end; a valve seat at the inner closed end of said valve chamber; a first set of external fluid ports formed in said body including, a pressure fluid inlet port, an exhaust port, a normally open delivery port, and a normally closed delivery port; a second set of internal fluid ports formed in said valve seat including, a pressure fluid inlet port, an exhaust port, a normally open delivery port, and a normally closed delivery port; a plurality of fluid transfer passages in said valve body connecting the similarly named ports in both of said sets of ports; a rotatable valve element mounted on said valve seat and being provided with fluid transfer passages for transferring the pressure fluid and the exhaust pressure in such a manner so as to create a differential pressure on the valve element to hold it on the valve seat and being rotatable between a first position and a second position, whereby when the valve element is in said first position the fluid transfer passages in the valve element will connect the pressure fluid inlet port in the valve seat to the normally open delivery port in the valve seat, and the normally closed delivery port in the valve seat to the exhaust port in the valve seat, and, when the valve element is rotated to the second position the connections of the delivery ports to the pressure fluid inlet port and the exhaust port will be reversed; and, actuating means engaged with the valve element for rotating said valve element between said first and second positions.

It is still a further object of the present invention to provide a four-way reversing valve which incorporates a valve element rotatable between working positions by either a linear actuating means or a rotary actuating means, and wherein said linear actuating means may be manually operated or power operated, and said rotary actuating means may be manually operated. The power operated linear actuating means may be actuated in two directions by a dual solenoid means, a solenoid means in one direction and a return spring in the other direction, or by an air pilot or vacuum pilot in one direction and a return spring in the other direction.

Other objects, features and advantages of this invention will be apparent from the following detailed description, appended claims, and the accompanying drawing.

In the drawing:

FIG. 1 is a side elevational view of a first embodiment or rotary valve made in accordance with the principles of the present invention;

FIG. 2 is a top plan view of the valve illustrated in FIG. 1, taken along the line 2—2 thereof, and looking in the direction of the arrows;

FIG. 3 is an enlarged, elevational section view of the valve illustrated in FIG. 2, taken along the line 3—3 thereof, looking in the direction of the arrows, and showing the valve in the de-energized position;

FIG. 4 is an elevational section view, similar to FIG. 3, and showing the valve in the energized position;

FIG. 5 is a fragmentary, enlarged, horizontal section view of the valve illustrated in FIG. 3, taken along the line 5—5 thereof, and looking in the direction of the arrows;

FIG. 6 is a fragmentary, enlarged, horizontal section view of the valve illustrated in FIG. 3, taken along the line 6—6 thereof, and looking in the direction of the arrows;

FIG. 7 is a fragmentary, enlarged, horizontal section view of the valve illustrated in FIG. 3, taken along the line 7—7 thereof, and looking in the direction of the arrows;

FIG. 8 is a fragmentary, elevational section view of a dual solenoid linear actuating means employed in the invention;

FIG. 9 is a fragmentary, elevational section view of a second dual solenoid, linear actuating means employed in the invention;

FIG. 10 is a fragmentary, elevational section view of a modification of the dual solenoid, linear actuating means shown in FIG. 9;

Figure 11:
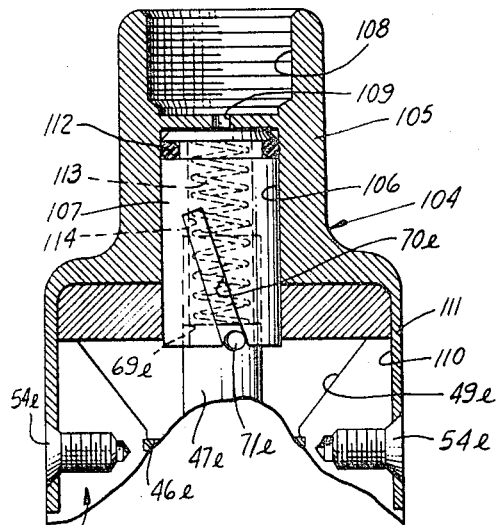
FIG. 11 is a fragmentary, elevational section view of an air pilot linear actuating means employed in the invention, and showing this means in the de-energized position.

Referring now to the drawing and in particular to FIG. 3, the numeral 10 generally designates a cylindrically shaped valve body having a closed lower end, and an open upper end in which is formed a cylindrical valve chamber 11. A cylindrical valve element, generally indicated by the numeral 12 is rotatably mounted in the valve chamber 11 and is adapted to be rotated between two operative or working positions by a linear actuating means comprising a power means in the form of a solenoid, generally indicated by the numeral 13, and a return spring, generally indicated by the numeral 14.

As shown in FIGS. 2 and 3, the valve body 10 is provided with a first set of external fluid ports which includes a pressure fluid inlet port 15 that is connected by the inwardly extended transverse passage or bore 16 and the axial passage or bore 17 to the pressure fluid inlet port 18 of a second set of internal fluid ports. The inlet port 18 is formed axially through a valve seat 19 which comprises a thin disc or wafer that is made from any suitable material having negligible resistance to relative motion between the rotatable valve element 12 and the valve seat 19. The valve seat 19 is secured in place at the inner closed end of the valve chamber 11 by any suitable means, as by a suitable adhesive.

The first set of external fluid ports further includes an exhaust port 20 (FIG. 2) which is connected by the inwardly extended transverse passage 21 and the axially extended passage 22 (FIG. 1) to the exhaust port 23 (FIG. 7) of the second set of internal fluid ports which is formed in the valve seat 19. As shown in FIGS. 2 and 3, the first set of external ports includes a first or normally closed delivery port 24 which is connected by inwardly extended transverse passage 25 and the axial passage 26 to the delivery port 27 of the second set of internal fluid ports in the valve seat 19. The first set of external fluid ports further includes a second or normally open delivery port 28 which is connected by the transverse passage 29 and the axial passage 30 to the second delivery port 31 of the second set of internal fluid ports in the valve seat 19.

FIG. 3 shows the four-way rotary reversing valve of the present invention in a de-energized position in which the normally open external delivery port 28 is connected to the fluid pressure inlet port 15 by the following described fluid passage. As shown in FIG. 6, the rotary valve element 12 is provided at its inner end with an axial passage 32 that communicates with the inner end of a passage 33. The passage 33 extends radially outward and rearwardly in the valve element 12 and the outer end of the passage 33 communicates with an annular chamber 34 having a stepped inner end and an open outer end. The annular chamber 34 is connected by means of an axial passage 35 in the valve element 12 with the inner port 31 in the valve seat 19 to permit fluid under pressure to flow to the normally open external delivery port 28. Simultaneously, fluid from the normally closed external port 24 is exhausted to the external exhaust port 20 by the following passage. The rotatable valve element 12 is provided with an annular passage 36 (FIGS. 3 and 6) on the inner end thereof which is provided with two radially extended connecting passage portions 37 and 38 (FIG. 6). The annular passage 36 is provided with a circumferentially extended, radially outward extension 39 (FIG. 6) which is positioned over the exhaust port 23 (FIG. 7) when the valve element 12 is in both the de-energized and energized positions of FIGS. 3 and 4, respectively. When the valve element 12 is in the de-energized position of FIG. 3, the exhaust passage portion 37 communicates with the port 27 in the valve seat 19, as shown in FIG. 3, so as to carry the exhausting fluid from the port 24 through the passage 36 to the passage portion 39, and thence downwardly through the port 23 to the exhaust port 20. When the valve element 12 is rotated to the energized position as shown in FIG. 4, the flow of fluid under pressure from the inlet port 15 is reversed as between the delivery ports 24 and 28, and the connection between these ports and the exhaust port 20 is reversed. As shown in FIG. 4, when the valve is energized, the fluid under pressure passes from the inlet port 15 into the passages 17, 18, 32 and 33 to the annular chamber 34, then through the passage 40 to the internal delivery port 27, and thence to the passages 26 and 25 to the external delivery port 24. The external delivery port 28 is connected by the passages 29, 30, 31, 38, 36, 39, 23, 22, and 21 to the external exhaust port 20.

As shown in FIG. 4, the rotatable valve element 12 is provided with a shaft 47 that extends rearwardly or in a direction opposite to the valve seat engaging the inner end of the valve element 12. The shaft 47 is disposed axially of the valve element 12, and is cylindrical in overall configuration. The valve element 12 is rotatably mounted in the chamber 11 by the following described structure. A circular spring washer 41 is seated in the annular chamber 34 and it supports a suitable O-ring sealing means 42. Mounted on the other side of the O-ring sealing means 42 is an anti-friction means comprising an inner bearing race 43 of a ball bearing means comprising a pluralty of bearing balls 44 which are rotatably mounted on the race 43 and held in position by the outer bearing race 45. The bearing races 43 and 45 are annular in configuration. The bearing race 45 is secured in position by means of the releasable retainer ring 46. A second retainer ring 48 is mounted around the shaft 47 at a position spaced outward from the bearing race 45 to hold the subassembly of the anti-friction bearing means and the O-ring sealing means 42 on the rotary valve element 12. As shown in FIG. 4, the valve body 10 is provided with a spring chamber 49 which is funnel-shaped and open at the outer end thereof, and which communicates at the inner end thereof with the valve element chamber 11.

It will be seen that the annular chamber 34 on the outer side of the rotary valve element 12 transfers the high pressure fluid from the inlet port 15 to the delivery ports 24 and 28, and that the low pressure exhaust fluid is transferred through the annular passage 36 on the inner end of the rotary valve element 12, whereby a differential pressure is created and impressed on the valve element 12 to hold it on the valve seat 19. It will also be seen, that the spring washer 41 exerts an inwardly directed pressure on the rotary valve element 12 that coacts with said differential pressure. When the valve is working with fluids under very low pressure, the pressure of the spring washer 41 exerted on the rotary valve element prevents the valve element 12 from lifting up from the seat 19 during operation of the valve. The spring washer 41 also functions to provide a differential pressure on the rotary valve element 12 to maintain it in engagement with the valve seat 19 when the valve is working as a vacuum valve during a vacuum operation.

The rotary valve element 12 is adapted to be rotated between the deenergized position of FIG. 3 and the energized position of FIG. 4 by an actuating means. The actuating means illustrated in FIGS. 3 and 4 is a linear actuating means which comprises a power means in the form of a solenoid 13 and a spring means 14. The solenoid 13 is mounted in a cylindrical cover or housing 50 which is provided with a cylindrical wall 51 that is open on the lower end thereof and enclosed on the upper end thereof by the end cap 52 which is secured to the housing 50 by an suitable means as by brazing. The open lower end of the housing 50 is seated over the reduced outer surface 53 of the valve body 10. The housing 50 is secured to the valve body 10 by any suitable means, as by a plurality of screws 54.

The solenoid 13 includes a coil bobbin or support member 55 which is annularly shaped and which is mounted by a slip fit in the solenoid housing or cover 50 in a position against and protruding through the inner face of the end cap 52. The coil bobbin 55 is held in place by the flux plate 56 for quick and easy disassembly. A conventional solenoid coil assembly 57 is carried by the coil bobbin 55 and it surrounds a solenoid plunger or armature, generally indicated by the numeral 58. The coil bobbin 55 may be made from any suitable material, as for example, a molded plastic bobbin impregnated with fiberglass.

The solenoid coil 57 is adapted to be connected to a suitable source of electrical energy by the electrical cables 59 (FIGS. 2 and 3). The wires 59 extend outwardly through a pair of protrusions 55a which are molded integral with the coil bobbin 55 and which extend through suitable holes in the end cap 52. A solenoid plunger 58 is slidably mounted in the axial bore 60 formed in the coil bobbin 55. The outer end of the axial bore 60 is enclosed by an inwardly extended plunger stop 61 which is cylindrical in overall configuration and which carries on the inner end thereof a circular shading coil 62. The solenoid plunger stop 61 is formed integral with the end wall 52. The shading coil 62 functions in the usual manner to provide an overlapping magnetic flux field to insure holding of the solenoid plunger 58 against the stop 61 when the solenoid coil 57 is energized.

The solenoid plunger 58 is adapted to reciprocate within the axial bore 60, but is prevented from rotating by the following described structure. As shown in FIGS. 3 and 4, the solenoid plunger 58 is provided on opposite sides thereof with the axially extended, elongated slots 63 and 64 into which is extended a pair of flanges or tongues 65 and 66 that are formed on the bobbin 55. It will be understood, that the positions of said slots and said tongues may be reversed. That is, said slots may be formed on the bobbin 55 and said tongues may be formed on the solenoid plunger 58.

As shown in FIGS. 3 and 4, the solenoid plunger 58 is provided on the inner end thereof with an outwardly extended, peripheral flange 67 which forms a seat for the inner end of the coil spring 14. The outer end of the coil spring 14 is seated in the peripheral recess 68 formed on the inner face of the lower flux plate 56. The spring 14 functions to return the solenoid plunger 58 to the de-energized position of FIG. 3 when the solenoid is de-energized.

The solenoid plunger 58 may also be termed a linear operator and it is provided with a drive means engageable with a driven means on the rotary valve element 12 for rotating the valve element 12 when the solenoid plunger 58 moves between the two working positions shown in FIGS. 3 and 4. As shown in FIGS. 3 and 4, the inner end of the solenoid plunger or linear operator 58 is provided with an inwardly extended bore 69 which receives the outer end of the valve element shaft 47 in a slidable manner. The drive means on the solenoid plunger 58 comprises a cam means in the form of a first helical slot 70 on one side of the plunger 58 for the slidable reception of one end of a pin or driven means 71 in the valve element shaft 47, and a second helical slot 70 on the other side of the plunger 58 for the slidable reception of the other end of the pin 71. The pin 71 is mounted in a transverse bore 72 (FIG. 5), formed in the shaft 47 by any suitable means, as by a press fit. The drive means or pin 71 comprises a cam follower which is adapted to be cammed by the cam means or pair of slots 70 in the following manner. When the solenoid is in the de-energized position shown in FIG. 3, the return spring 14 will move the solenoid plunger 58 toward the rotary valve element 12. When the solenoid is energized, the solenoid plunger 58 will be pulled upwardly to the position shown in FIG. 4 and the helical slots 70 wall cam the pin 71 in a circular or rotary direction as the plunger 58 is moved upwardly. The pin 71 in the rotary valve element 12 will be cammed in a reverse rotary direction when the solenoid is de-energized and the return spring 14 moves the solenoid plunger 58 downwardly to the position shown in FIG. 3.

The valve of the present invention may be used for various fluid flow control purposes. For example, it may be used to control the flow of pressurized fluid to one end of a fluid cylinder while exhausing fluid from the other end of the cylinder, and then reversing this operation.

The slope of the helical slots 70 is formed in accordance with the desired rotary travel of the rotary valve element 12. For example, in one embodiment the rotary valve element 12 was moved through a 30° travel by means of a $5/16''$ rise in the slots 70. The term "rise" is used to indicate the amount of linear travel of the solenoid plunger 58. A valve made in accordance with the invention may be made to operate over any desired pressure range.

It will be understood that the valve of the present invention may be used as a primary valve for controlling the flow of a fluid under pressure or as a pilot valve for controlling a second or primary valve. It will also be seen, that the high pressure fluid passes through the rotary valve element 12 in its course or path to the delivery ports 24 and 28, and that the exhausting or lower pressure fluid is conducted through the valve element 12 along the inner face thereof which seats on the valve seat 19. The last described flow conditions provide a differential pressure which functions to hold the rotary valve element 12 on the valve seat 19. It has been found that the valve of the present invention provides a fast operating and compact valve which can be shifted between its operative positions with a minimum of torque due to the novel construction of the valve. The inner bearing race 43 is made from any suitable material, as aluminum. It will be understood, that any suitable means may be used for maintaining the linear movement of the plunger 58, other than the slot and tongue arrangement illustrated in FIGS. 3 and 4. It will be understood that the valve body 10 may be made from any suitable material and in any suitable manner, as for example, by die casting.

FIG. 8 illustrates a dual solenoid actuating means employed in the invention. The parts of the actuating means which are similar to the actuating means shown in FIGS. 3 and 4 of the first embodiment are marked with the same reference numerals followed by the small letter *b*. In the embodiment of FIG. 8 the valve shaft 47b for operating the rotary valve element 12 is moved between the two operating positions by a dual solenoid action.

The dual solenoid actuating means includes a first solenoid coil 57b, and a second solenoid coil 57b′ which is spaced apart from the first solenoid coil 57b in the housing or cover 50b. The two solenoid coils 57b and 57b′ are held in their operative positions in the housing 50b by suitable means, as by the molded plastic bobbin 55b. The actuating means of the embodiment of FIG. 8 includes a pole piece 73 which is disposed between the solenoid coils 57b and 57b′. The solenoid actuating means of this embodiment further includes a bottom flux plate 56b. A suitable dowel pin 74 aligned the flux plate 56b in a predetermined position relative to the valve body 10b.

The solenoid means of the embodiment of FIG. 8 includes a first or bottom armature or plunger 58b which is constructed in the same manner as the plunger 58 of the first embodiment, and which is provided with a pair of helical cam driving slots 70b in the same manner as the first embodiment. The rotary valve element for this embodiment would be the same as in the embodiment of FIGS. 3 and 4, and it is provided with the shaft 47b which carries the cam pins 71b. The actuating end of the bottom armature 58b is provided with a pair of annular detent recesses 75 and 76, around the periphery thereof, and in axially spaced apart positions. The bottom flux plate 56b is movably mounted in the bore 60b' in the top end of mounted a suitable detent 78 that is spring biased by the spring 79 toward the armature 58b. The detent 78 is adapted to engage the detent recess 75 to hold the armature 58b in the one working position shown in FIG. 8. When the armature 58b is moved upwardly, the detent 78 will engage the detent recess 76 to hold the actuating means in the second operating position.

The bottom armature or plunger 58b is prevented from rotating by the same slot and tongue arrangement as used in the embodiment of FIGS. 3 and 4. The slots in the armature 58b are indicated by the numerals 63b and 64b, and the tongues formed on the bobbin 55b are indicated by the numerals 65b and 66b.

The solenoid means of the embodiment of FIG. 8 includes a top or second armature or plunger 58b' which is movably mounted in the bore 60b' in the top end of the bobbin 55b. The armature 58b' is adapted to be operated by the solenoid coil 57b', and it is connected to the bottom armature or plunger 58b by the axially disposed rod 80. The rod 80 is fixedly connected to the plungers 58b and 58b' by any suitable means, and it is slidably mounted through the axial bore 81 formed through the pole piece 73. The top end of the cover body 51b is enclosed by the top flux plate 52b which is secured to the body 51b by any suitable means, as by brazing. The flux plate 52b is provided with an axial hole 82 through which the top armature 58b' moves during operation of the solenoid means. The opening 82 is enclosed by a cap 83 which is secured to the flux plate 52b by any suitable means, as by a plurality of screws 84. The solenoid means is secured to the valve body 10b in the same manner as the solenoid means of the embodiment of FIGS. 3 and 4. As shown in FIG. 8, the bottom end of the solenoid housing 50b is seated over the top end of the valve body 10b and secured thereto by a plurality of screws 54b.

With the solenoid means of FIG. 8 in the position shown, the rotary valve element would be in a first operating position. When the solenoid coil 57b is energized by power supplied through the lead wires 59b, the bottom armature 58b will be pulled upwardly and the detent 78 will be engaged with the detent recess 76 to hold the armature 58b in a positive stopped position. When the armature 58b is moved upwardly, the rotary valve element shaft 47b will be rotated in the same manner as described for the embodiment of FIGS. 3 and 4 when the plunger 58 is moved to the position shown in FIG. 4. When the top solenoid coil 57b' is energized by power supplied through the lead wires 59b', the top plunger 58b' will be pulled downwardly to return the rotary valve element shaft 47b to the position shown in FIG. 8. It will be seen that the dual solenoid actuation means of FIG. 8 provides a linear actuating means which is solenoid operated in each direction to move the rotary valve element between its two working positions. The use of the detent 78 to retain the armature 58b in a positive stopped condition, in the two working positions, eliminates a need for any shading coils in the solenoid means of FIG. 8.

FIG. 9 illustrates a second dual solenoid actuating means employed in the invention. The parts of the embodiment of FIG. 9 which are the same as the embodiment of FIGS. 3 and 4 have been marked with the same reference numerals followed by the small letter c. The dual solenoid actuating means of FIG. 9 is adapted to rotate the valve element shaft 47c between two operating positions in the same manner as the embodiment of FIG. 8. The dual solenoid means of FIG. 9 comprises a solenoid housing 50c having a cylindrical cover body 51c which is enclosed on the upper end thereof by the combination end cap and top pole piece 52c. The end cap and pole piece 52c is secured to the cover body 51c by any suitable means, as by brazing.

Slidably mounted in the cover body 51c are the axially spaced apart solenoid coils 57c and 57c' which are carried on the bobbin 55c that is made from any suitable material, as for example, a molded plastic. The solenoid coils 57c and 57c' are energized through the lead wires 59c and 59c'. The solenoid means of FIG. 9 includes the bottom pole piece 56c, and the flux plate 85 which is disposed between the solenoid coils 57c and 57c'. The solenoid means of FIG. 9 includes a single, elongated plunger or armature 58c which is slidably mounted in the bore 60c in the bobbin 55c, and retained against rotation by a pair of spaced apart, axially disposed pins 86 and 87. The bottom ends of the pins 86 and 87 are connected to a cylindrical actuator 88 which includes the bore 69c on the lower end thereof in which is slidably mounted the rotary valve element shaft 47c. The actuator 88 is provided with a pair of helical cam slots 70c in which are slidably mounted a pair of cam pins 71c, in the same manner as the first embodiment of FIGS. 3 and 4.

The bottom ends of the rods 86 and 87 are secured to the actuator 88 by any suitable means, as by being threadably mounted in place. The rods 86 and 87 extend upwardly through the axial, laterally spaced apart bores 89 and 90, respectively, in the bottom pole piece 56c. The top ends of the rods 86 and 87 extend into the bores 91 and 92 in the bottom end of the armature or plunger 58c. The rods 86 and 87 are secured to the armature 58c by any suitable means, as by the cross pin 93 that is threadably mounted in a transverse position in the armature 58c and which engages the circular, peripheral recesses on the upper ends of the pins 86 and 87.

As shown in FIG. 9, the armature 58c is provided with a pair of axially spaced apart, circumferential detent recesses 96 and 97. An O-ring type detent 98, made from a flexible material, is operatively mounted in a circular recess 99 formed in the inner surface of the bore 100 that is formed through the flux plate 85. The armature 58c extends through the bore 100, and when the armature 58c is in the one operating position shown in FIG. 9, the detent 98 engages the detent recess 96 to maintain the armature 58c in a positive stopped condition. When the top solenoid coil 57c' is energized, the armature 58c will be pulled upwardly and the detent 98 will engage the detent recess 97 to maintain the armature 58c in the second operating position.

The dual solenoid, linear actuating means of FIG. 9 moves the rotary valve element shaft 47c between the two operating positions in the same manner as the dual solenoid means of FIG. 8. The solenoid means of FIG. 9 would be secured to the valve body 10c in the same manner as the first described embodiment, and in the same manner as the dual solenoid means of FIG. 8. The solenoid means of FIG. 9 includes a spacing sleeve 101 for spacing the solenoid means relative to the valve body 10c when the solenoid means is mounted on the valve body 10c.

FIG. 10 illustrates a slight modification of the embodiment of FIG. 9. The parts of the structure of the embodiment of FIG. 10 which are the same as that of FIG. 9 are marked with the same reference numerals followed by the small letter d. FIG. 10 shows the actuator 88d of a dual solenoid linear actuating means attached to the armature 58d in a slightly different manner. In the embodiment of FIG. 10, the actuator 88d is provided with a connection shaft 102 which is connected to the lower end of the armature or plunger 58d along the line 103 by any suitable means, as by a suitable adhesive. It will be understood that the actuator 88d of FIG. 10, as well as the actuator 88 of FIG. 9, may be made from any suitable material, as for example, plastic.

The armature 58d would be prevented from rotating by a tongue and slot arrangement similar to that used in the embodiment of FIGS. 3 and 4 and the embodiment of FIG. 8. The armature 58d is shown as being provided with the slots 63d and 64d which receive the tongues 65d and 66d, respectively, which are integrally formed on the bobbin 55d. The armature 58d would be provided with the detent means shown in the embodiment of FIG. 9. The embodiment of FIG. 10 would include the same dual solenoid means of FIG. 9 for moving the single armature 58d between the two operating positions so as to move the rotary valve element shaft 47d between the two working positions.

Figure 12:
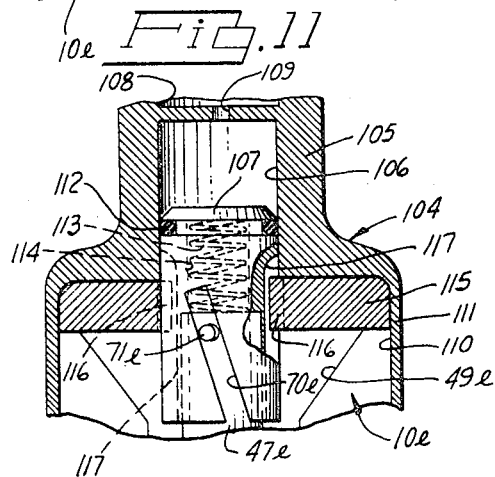
FIG. 12 is a fragmentary view, similar to that of FIG. 11, and showing the air pilot linear actuating means in the energized position.

FIGS. 11 and 12 illustrate a further linear actuating means employed in the invention. The parts of this embodiment which are similar to the parts of the first embodiment of FIGS. 3 and 4 are marked with the same reference numerals followed by the small letter e. The linear actuating means of FIGS. 11 and 12 comprises an air operated means which includes a housing, generally indicated by the numeral 104, that is adapted to be secured to the valve body 10e in the same manner as in the first described embodiment of FIGS. 3 and 4, as by the screws 54e. The housing 104 includes the upper reduced cylindrical portion 105 which is integral with the lower enlarged portion 111 that is secured to the valve body 10e. The top reduced housing portion 105 is provided with an enlongated bore 106 in which is slidably mounted a cylindrical piston or actuator 107. The top end of the bore 106 communicates with a threaded pilot port 108 through a passage 109. The pilot port 108 would be connected to a suitable source of fluid under pressure as, for example, air under pressure.

The bottom end of the bore 106 communicates with the enlarged chamber 110 inside of the enlarged housing portion 111. The actuator 107 is provided with the inwardly extended, axial bore 69e in which is slidably received the rotary valve element shaft 47e. The top end of the actuator 107 is provided with a suitable O-ring sealing means 112. A spring 113 is operatively mounted in a reduced inner bore 114 in the actuator 107. The spring 113 abuts the top end of the rotary valve element shaft 47e to return the piston actuator 107 upwardly to the one operating position shown in FIG. 11. The embodiment of FIGS. 11 and 12 moves the rotary valve element shaft 47e from a first working position shown in FIG. 11 to the second working position shown in FIG. 12 by a pushing operation, as distinguished from a pulling operation shown in the previously described embodiments. When air under pressure is admitted into the port 108, the piston actuator 107 is moved to the position shown in FIG. 12 whereby the cam slot 70e cams the pins 71e in a direction to rotate the rotary valve element shaft 47e to a second working position.

The piston actuator 107 may be retained against rotation by any suitable means, as by the tongue and slot arrangement illustrated in FIG. 12. As shown in FIG. 12, a spacer member 115 is mounted in the upper end of the enlarged housing portion chamber 110, and it is provided with a pair of oppositely disposed tongues or bayonets 116 that are slidably engaged in the slots 117 formed on the opposite sides of the piston actuator 107. When the fluid under pressure is reversed, the spring 113 functions to move the piston actuator 107 upwardly to the first position shown in FIG. 11. The position of the actuator 107 in FIG. 11 may be termed the de-energized position, and the position of the actuator 107 in FIG. 12 may be termed the energized position.

Figure 14:
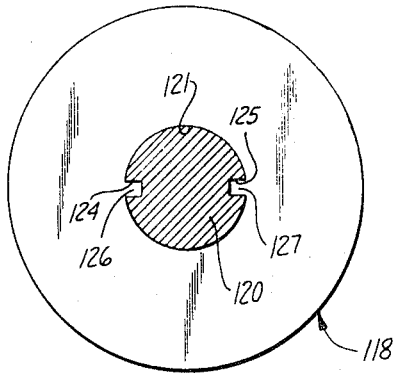
FIG. 14 is a horizontal view, partly in section, of the structure illustrated in FIG. 13, taken along the line 14—14 thereof, and looking in the direction of the arrows.
Figure 13:
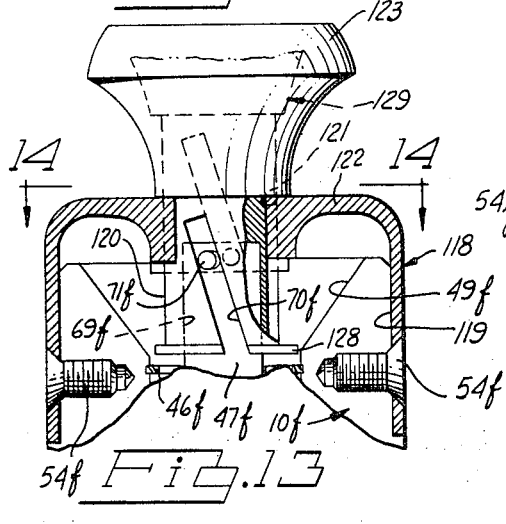
FIG. 13 is a fragmentary, elevational section view of a manually operated linear actuating means employed in the invention.

FIGS. 13 and 14 illustrate a manually operated linear actuating means employed in the invention for operating the rotary valve element 12 between the two working positions. The parts of the embodiment of FIGS. 13 and 14 which are the same as the embodiment of FIGS. 3 and 4 are marked with the same reference numerals followed by the small letter f. The numeral 118 indicates a housing for the manual operating means which is adapted to be connected to the valve body 10f by the screws 54f in the same manner as the embodiment of FIGS. 3 and 4. The manual operating means of FIGS. 13 and 14 includes a cylindrical piston or actuator 120 which is disposed in the interior 119 of the housing 118 and which is connected to the rotary valve element shaft 47f in the same manner as the previously described linear actuating means. The manual linear actuating means of FIGS. 13 and 14 is of the pull type operation, similar to the previously described solenoid linear actuating means.

The piston actuator 120 is slidably mounted through the bore 121 formed through the housing end wall 122, and it is provided on the outer end thereof with the handle 123 for moving the piston actuator 120 inwardly and outwardly relative to the housing 118. The piston actuator 120 is restrained from rotation by a slot and tongue arrangement similar to that employed in the first embodiment of FIGS. 3 and 4. As shown in FIG. 14, the piston actuator 120 is provided with a pair of opposite slots 124 and 125 and which slidably receive the tongues 126 and 127, respectively, formed on the housing end wall 122. As shown in FIG. 13, the actuator 120 is provided on the inner end thereof with a stop flange 128.

When the handle 123 is in the solid line position shown in FIG. 13, the actuator 120 is in a first operating position. The operator may move the actuator 120 to a second position to rotate the rotary valve element piston 47f to the second operating position by pulling the handle 123 outwardly to the dotted line position indicated by the numeral 129. When the handle 123 is pushed inwardly again to the solid line position, the rotary valve element would be returned to its initial operating position.

Figure 16:
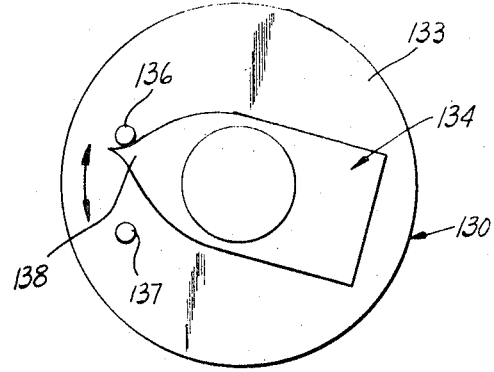
FIG. 16 is a plan view of the structure illustrated in FIG. 15, taken along the line 16—16 thereof, and looking in the direction of the arrows.
Figure 15:
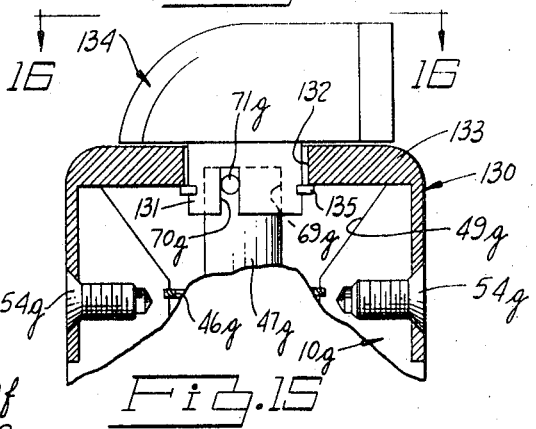
FIG. 15 is a fragmentary, elevational section view of a manually operated, rotatable actuating means employed in the invention, and showing this means in what may be termed the de-energized position.

FIGS. 15 and 16 illustrate a manually operated rotary actuating means for rotating the rotary valve element 12 between the two working positions. The parts of the embodiment of FIGS. 15 and 16 which are the same as the embodiment of FIGS. 3 and 4 are marked with the same reference numerals followed by the small letter g. The manual rotary actuating means of FIGS. 15 and 16 includes a housing, generally indicated by the numeral 130, which is adapted to be connected to the valve body 10g in the same manner as the first described embodiment of FIGS. 3 and 4 as by the screws 54g.

The rotary valve element shaft 47g is provided with a pair of cam pin ends 71g which are adapted to be slidably received in a pair of cam slots 70g formed in diametrically opposite positions in a cylindrical actuator 131. The rotary valve element shaft 47g extends into the bore 69g formed in the inner end of the cylindrical rotary actuator 131. The actuator 131 extends outwardly through the bore 132 formed in the housing end wall 133. Fixedly mounted on the outer end of the actuator 131, by any suitable means, is a knob 134 which is adapted to be grasped between the fingers of an operator for rotating the actuator 131. The actuator 131 may be secured to the manual operating knob 134 by any suitable means. The rotary actuator 131 is retained in the bore 132 by the releasable retainer ring 135.

As shown in FIG. 16, a pair of pins 136 and 137 are fixed on the outer side of the housing wall 133 in a pair of circumferentially spaced positions. The operating knob 134 is provided with a pointed end 138 which is adapted to engage the stop pins 136 and 137 when the cylindrical actuator 131 is rotated between its two operating positions.

It will be seen that when the knob 134 is rotated counter-clockwise from the solid line position shown in FIG. 16 so as to bring the pointed end 138 against the pin 137, the rotary valve element shaft 47g will be rotated so as to move the rotary valve element to a second working position. When the knob 134 is rotated in a clockwise direction back to the position shown in FIG. 16, the rotary valve element will be returned to its initial working position.

What is claimed is:

1. A four-way reversing valve of the class described comprising:
   (a) a valve body;
   (b) a valve chamber in said valve body having a closed inner end and an open outer end;
   (c) a valve seat at the inner closed end of said valve chamber;
   (d) a first set of external fluid ports formed in said body including, a pressure fluid inlet port, an exhaust port, a normally open delivery port, and a normally closed delivery port;
   (e) a second set of internal fluid ports formed in said valve seat including, a pressure fluid inlet port, an exhaust port, a normally open delivery port, and a normally closed delivery port;
   (f) a plurality of fluid transfer passages in said valve body connecting the similarly named ports in both of said sets of ports;
   (g) a rotatable valve element mounted on said valve seat;
   (h) said valve element being provided with a pressure fluid transfer internal passage means spaced from the valve seat end of the valve element for receiving fluid under high pressure from the pressure fluid inlet port of said second set of internal fluid ports, said internal passage means being open on the end of the valve element opposite the valve seat end of the valve element and having said open end enclosed by a floating enclosure means releasably retained in the outer end of the valve chamber, and an exhaust fluid passage means spaced from said last mentioned pressure fluid transfer passage in a position adjacent the valve seat end of the valve element for receiving low pressure exhaust fluid from the delivery ports and transferring it to the exhaust port of said second set of internal fluid ports whereby, a controlled differential pressure is created on the valve element to maintain the valve element on the valve seat;
   (i) said valve element being rotatable between a first position and a second position, whereby when the valve element is in said first position said pressure fluid transfer passage means in the valve element connects the pressure fluid inlet port in the valve seat to the normally open delivery port in the valve seat, and said exhaust fluid passage means in the valve element connects the normally closed delivery port in the valve seat to the exhaust port in the valve seat, and, when the valve element is rotated to the second position the connections of the delivery ports to the pressure fluid inlet port and the exhaust port will be reversed relative to the aforementioned first valve element position connections; and,
   (j) actuating means engaged with the valve element for rotating said valve element between said first and second positions.

2. A four-way reversing valve as defined in claim 1, wherein:
   (a) said pressure fluid transfer passage means comprises an annular chamber.

3. A four-way reversing valve as defined in claim 2, wherein:
   (a) said annular chamber is open on the end of the valve element connects the normally closed delivery valve element; and,
   (b) said enclosure means includes a sealing means mounted in the open end of the annular chamber.

4. A four-way reversing valve as defined in claim 3, wherein:
   (a) said enclosure means includes a bearing means mounted in said valve chamber in a position engaging said sealing means and for rotatably centering the valve element in the valve chamber.

5. A four-way reversing valve as defined in claim 4, including:
   (a) spring means in said annular chamber engaging said sealing means in a position opposite said bearing means.

6. A four-way reversing valve as defined in claim 1, wherein:
   (a) said exhaust fluid passage means comprises an annular chamber formed in the valve seat end of the valve element.

7. A four-way reversing valve as defined in claim 1, including:
   (a) spring means engaging said valve element for biasing the valve element against the valve seat for low pressure and vacuum operations.

8. A four-way reversing valve as defined in claim 1, including:
   (a) anti-friction means rotatably centering the valve element in the valve chamber.

9. A four-way reversing valve as defined in claim 1, wherein:
   (a) said valve seat comprises a thin disk.

10. A four-way reversing valve as defined in claim 9, wherein:
    (a) said thin disk is made from a material having negligible resistance to relative motion between said valve element and the valve seat.

11. A four-way reversing valve as defined in claim 1, wherein:
    (a) said actuating means comprises a linear actuating means operable along the axis of rotation of the valve element and engaging the valve element for rotating said valve element between said first and second positions.

12. A four-way reversing valve as defined in claim 11, wherein:
    (a) said linear actuating means includes a linear operator for rotating the valve element between said first and second positions.

13. A four-way reversing valve as defined in claim 12, wherein:
    (a) said linear actuating means includes means for moving the linear operator along the axis of rotation of the valve element for rotating the valve element between said first and second positions.

14. A four-way reversing valve as defined in claim 13, wherein:
    (a) said valve element is provided with a driven means; and,
    (b) said linear operator is provided with a drive means engageable with said driven means on the valve element for rotating said valve element between said positions.

15. A four-way reversing valve as defined in claim 14, wherein:
    (a) said driven means on the valve element comprises a cam follower; and,
    (b) said drive means on the linear operator comprises a cam means engageable with said cam follower for rotating said valve element between said positions when the linear operator is moved along the axis of rotation of said valve element.

16. A four-way reversing valve as defined in claim 15, wherein:
    (a) said cam follower comprises a pin on said valve element in a position transverse to the axis of rotation of the valve element; and, (b) said cam means comprises a helical slot on said linear operator engageable with said pin, whereby when the linear operator is moved along the axis of rotation of the valve element the sides of the helical slot will engage the pin to exert a rotational force on the pin to rotate the valve element.

17. A four-way reversing valve as defined in claim 13, wherein said means for moving the linear operator along the axis of rotation of the valve element includes:

(a) a power means for rotating the valve element from said first position; and, (b) return spring means for rotating the valve element from said second position to said first position.

18. A four-way reversing valve as defined in claim 17, wherein:

(a) said electrical power means comprises an elec- means.

19. A four-way reversing valve as defined in claim 18, wherein:

(a) said electrical power means comprises an electric solenoid and said linear operator comprises the movable, non-rotational, armature of the solenoid for rotating the valve element from said first position to said second position when the solenoid is energized and the armature moves from a de-energized position to an energized position; and, (b) said return spring means engages said armature and returns the armature to the de-energized position when the solenoid is de-energized.

20. A four-way reversing valve as defined in claim 17, wherein:

(a) said power means comprises fluid pressure operated means.

21. A four-way reversing valve as defined in claim 20, wherein:

(a) said fluid pressure operated means comprises a fluid pressure operated, non-rotatable piston connected to the linear operator.

22. A four-way reversing valve as defined in claim 13, wherein said means for moving the linear operator along the axis of rotation of the valve element includes:

(a) a dual electric solenoid means.

23. A four-way reversing valve as defined in claim 22, wherein:

(a) said solenoid means includes a pair of aligned solenoid coils; and, (b) non-rotational armature means operatively mounted in said solenoid coils and connected to the linear operator for moving the linear operator along the axis of rotation of the valve element.

24. A four-way reversing valve as defined in claim 23, including:

(a) detent means engageable with said armature means for releasably holding the linear operator in each of said first and second positions.

25. A four-way reversing valve as defined in claim 23, wherein said detent means includes:

(a) a pair of spaced detent recesses on the armature means; and, (b) a spring biased detent member selectively engageable with said recesses.

26. A four-way reversing valve as defined in claim 23, wherein said detent means includes:

(a) a pair of spaced detent recesses on the armature means; and, (b) a flexible O-ring detent member selectively engageable with said recesses.

27. A four-way reversing valve as defined in claim 23, wherein:

(a) said armature means comprises a pair of armature members connected by an elongated rod.

28. A four-way reversing valve as defined in claim 23, wherein:

(a) said armature means comprises a single elongated armature member.

29. A four-way reversing valve as defined in claim 23, wherein:

(a) said linear operator is integrally formed with the armature means.

30. A four-way reversing valve as defined in claim 23, wherein:

(a) said linear operator is separately formed and is connected to said armature means by an adhesive.

31. A four-way reversing valve as defined in claim 23, wherein:

(a) said linear operator is separately formed and is connected to said armature means by a plurality of rods.

32. A four-way reversing valve as defined in claim 13 wherein said means for moving the linear actuator along the axis of rotation of the valve element includes:

(a) a manually operated means connected to said linear operator.

33. A four-way reversing valve as defined in claim 1, wherein:

(a) said actuating means for rotating said valve element between said first and second positions comprises a manually operable means connected to said valve element and rotatable between two operating positions.

References Cited

UNITED STATES PATENTS

| 3,378 | 12/1843 | Kelsey | 137—625.61 |
| 477,706 | 6/1892 | Rymer | 137—625.21 |
| 795,911 | 8/1905 | Hall | 251—87 |
| 2,315,775 | 4/1943 | D'Arcey | 251—87 |

M. CARY NELSON, Primary Examiner

WILLIAM R. CLINE, Assistant Examiner

U.S. Cl. X.R.

251—58, 137, 138, 175, 253, 297

PO-1050
(5/69)

UNITED STATES PATENT OFFICE
CERTIFICATE OF CORRECTION

Patent No. 3,469,604          Dated September 30, 1969

Inventor(s) Walter D. Ludwig

It is certified that error appears in the above-identified patent and that said Letters Patent are hereby corrected as shown below:

Column 3, line 52, after "by" insert -- the --. Column 5, line 11, "an" should be -- any --. Column 6, line 14, "wall" should be -- will --. Column 7, line 1, "aligned" should be -- aligns --; line 16, "is movably mounted in the bore 60b' in the top end of" should be -- is provided with a transverse bore 77 in which is slidably --. Claim 3, column 12, line 1, "valve element connects the normally closed delivery" should be -- valve element opposite the valve seat end of the --. Claim 18, column 13, line 18, "(a) said electrical power means comprises an elec-" should be -- (a) said power means comprises an electrical power --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents